(12) United States Patent
Doty

(10) Patent No.: US 10,986,786 B2
(45) Date of Patent: Apr. 27, 2021

(54) MOVABLE PLANT RACK DRAINAGE SYSTEM

(71) Applicant: Clinton Doty, Kelowna (CA)

(72) Inventor: Clinton Doty, Kelowna (CA)

(*) Notice: Subject to any disclaimer, the term of this patent is extended or adjusted under 35 U.S.C. 154(b) by 318 days.

(21) Appl. No.: 16/224,376

(22) Filed: Dec. 18, 2018

(65) Prior Publication Data

US 2020/0187426 A1   Jun. 18, 2020

(51) Int. Cl.
*A01G 9/02* (2018.01)
*F16L 11/00* (2006.01)

(52) U.S. Cl.
CPC .............. *A01G 9/023* (2013.01); *F16L 11/00* (2013.01)

(58) Field of Classification Search
CPC ...... A01G 9/023; A01G 27/00; A01G 27/001; A01G 27/006
See application file for complete search history.

(56) References Cited

U.S. PATENT DOCUMENTS

| | | | |
|---|---|---|---|
| 5,673,511 A | 10/1997 | Holtkamp, Jr. | |
| 6,243,985 B1* | 6/2001 | Miller | A01G 27/00 47/39 |
| 7,395,630 B2 | 7/2008 | Schomaker et al. | |
| 7,845,108 B2 | 12/2010 | Korte et al. | |
| 8,448,379 B2 | 5/2013 | Igarashi | |
| 9,010,022 B2 | 4/2015 | Brusatore | |
| 9,781,884 B1* | 10/2017 | Iwai | A01C 21/00 |
| 10,015,941 B2 | 7/2018 | Miyabe et al. | |
| 2002/0029517 A1 | 3/2002 | Hutchinson et al. | |
| 2009/0031625 A1* | 2/2009 | McAvoy | A01G 25/00 47/48.5 |
| 2011/0154985 A1* | 6/2011 | Mittelmark | F24F 3/16 95/1 |
| 2011/0232185 A1* | 9/2011 | Ahmadi | A01G 27/04 47/66.6 |
| 2013/0019527 A1 | 1/2013 | Howe-Sylvain | |
| 2015/0052809 A1* | 2/2015 | Janssen | A01G 9/02 47/79 |
| 2015/0289463 A1* | 10/2015 | Moriarty | A01G 27/001 47/62 R |
| 2016/0324090 A1 | 11/2016 | Miyabe et al. | |
| 2016/0345518 A1 | 12/2016 | Collier et al. | |
| 2017/0172084 A1 | 6/2017 | Fox et al. | |
| 2017/0223904 A1 | 8/2017 | Raccanello | |
| 2017/0339846 A1 | 11/2017 | Lawrence et al. | |

* cited by examiner

*Primary Examiner* — Monica L Barlow
(74) *Attorney, Agent, or Firm* — Richard D. Okimaw

(57) ABSTRACT

A drainage system for connecting a rack drain on a mobile plant rack to a stationary building drain, wherein the plant rack is operable to slide between first and second positions wherein the building drain is proximate and distal thereto, respectively. The drainage system comprises at least one horizontal support proximate to the bottom of the mobile plant rack and a flexible conduit fluidically connected to the discharge end of the rack drain, extending arcuately between a receiving end fixed within the interior rack space and a discharge end fixed outside of the interior rack space, wherein the discharge end is fluidically connected to the stationary building drain. The receiving end of the flexible conduit is raised above the discharge end and the flexible conduit is supported by the at least one horizontal support to maintain a generally down slope grade.

10 Claims, 5 Drawing Sheets

MOVABLE PLANT RACK DRAINAGE SYSTEM

BACKGROUND OF THE INVENTION

1. Field of Invention

The present invention relates generally to a drainage system for a plant rack and more particularly to a flexible drain system which maintains a connection between a drain on a laterally slideable mobile plant rack and a fixed building drain.

2. Description of Related Art

As is commonly known, plants do not absorb all of the water provided to them, and thus they must be drained to prevent over-watering. Excess water on a plant rack may be directed to drainage systems that may or may not include valves to prevent the water from being released therefrom. In some cases, the water is drained directly to the ground or floor, resulting in a wet surface which can be a safety or hygiene concern for workers.

To eliminate the possibility of water draining on to the floor, a drainage member, such as a tube or pipe, may be connected to the plant rack drainage system and directed into a floor or building drain. This system is acceptable for stationary racks where the tube can be fixed to the rack and directed into the drain, however, it is disadvantageous for mobile plant racks where movement of the rack may dislocate the tube from within the drain or otherwise restrict movement of the rack.

Mobile plant racks include rollers on the base which allow the rack to be relocated as needed. To optimize the usage of space, a plurality of racks may be positioned next to each other and moved only to provide intermittent access thereto. With current drainage systems, the movement of the racks may dislocate a drainage tube from within a drain, as outlined above, or may result in binding of the rollers on the tubes and they do not maintain a constant drain grade.

SUMMARY OF THE INVENTION

According to a first embodiment of the present invention there is disclosed a drainage system for connecting a rack drain on a laterally slidable mobile plant rack to a stationary building drain, wherein the mobile plant rack extends between top, bottom, front, rear, first side and second side defining an interior rack space and the rack drain includes a discharge end, and wherein the mobile plant rack is operable to slide between a first position wherein the stationary building drain is proximate thereto and a second position wherein the stationary building drain is distal thereto. The drainage system comprises at least one horizontal support proximate to the bottom of the mobile plant rack and a flexible conduit fluidically connected to the discharge end of the rack drain, extending arcuately between a receiving end fixed within the interior rack space and a discharge end fixed outside of the interior rack space, wherein the discharge end is fluidically connected to the stationary building drain. The receiving end of the flexible conduit is raised above the discharge end and the flexible conduit is supported by the at least one horizontal support to maintain a generally down slope grade between the receiving end and the discharge end of the flexible conduit.

The at least one horizontal support may include a top surface. The flexible conduit may be supported on the top surface.

The drainage system may further comprise a substantially horizontal rigid conduit fluidically connected to the discharge end of the rack drain at a first end and extending along the front of the mobile plant rack to a fixed second end positioned within the interior rack space. The receiving end of the flexible conduit may be fluidically connected to the fixed second end of the rigid conduit.

The drainage system may further comprise at least one low friction vertical surface proximate to the rear of the plant rack positioned such that a portion of the flexible conduit is engageable thereon. The at least one low friction vertical surface may comprise a plurality of vertical rollers distributed between the first and second sides. The flexible conduit may engage upon the at least one low friction vertical surface at the first position.

The drainage system may further comprise a substantially horizontal second flexible conduit, vertically spaced apart from the flexible conduit, the second flexible conduit fluidically connected to the discharge end of the rack drain, extending arcuately between a second flexible conduit receiving end fixed within the interior rack space and a second flexible conduit discharge end fixed outside of the interior rack space, wherein the second flexible conduit discharge end is fluidically connected to the stationary building drain.

The flexible conduit may be formed with a material selected from a group consisting of polyvinyl chloride tubing and polyethylene tubing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
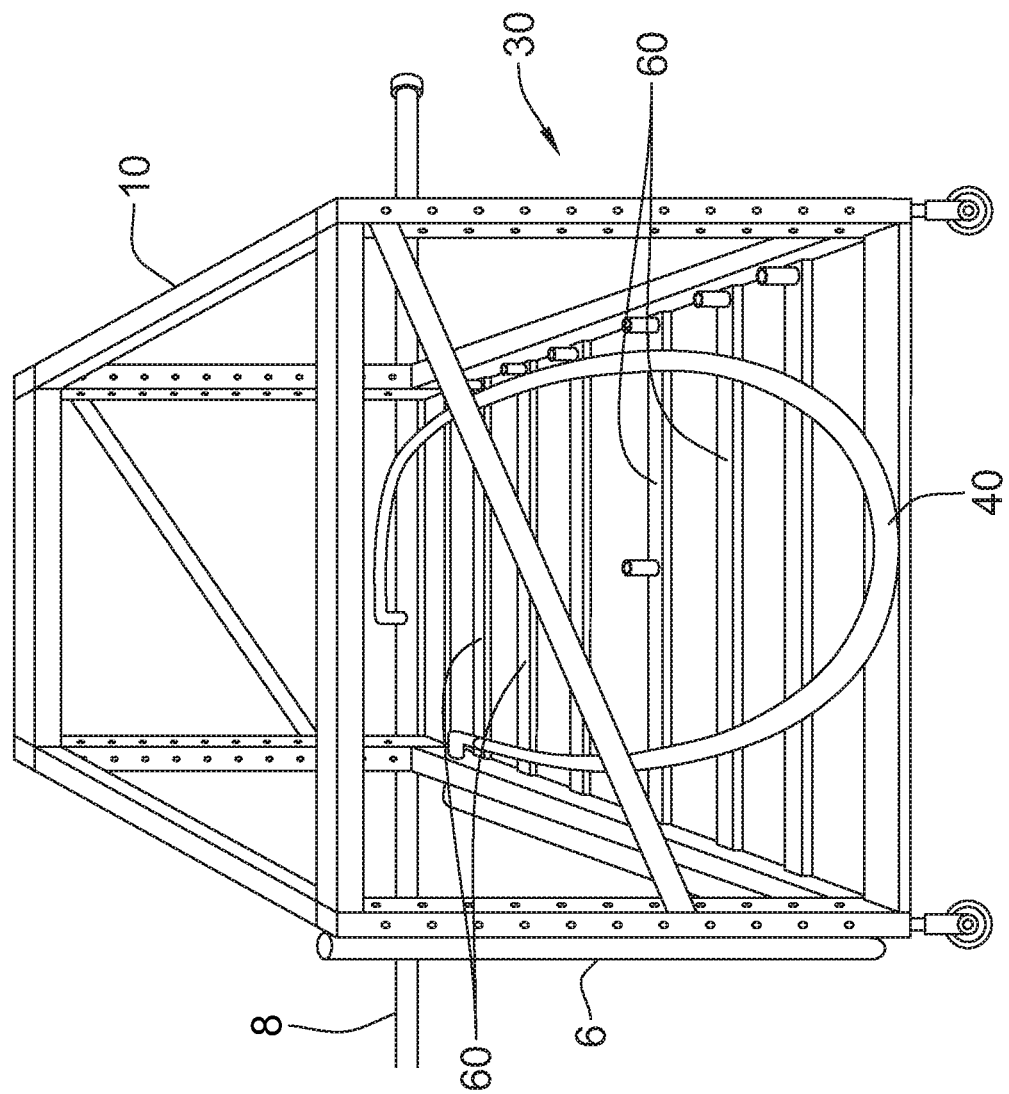
FIG. 1 is a perspective view of a mobile plant rack with a drainage system attached to a building drain according to a first embodiment of the present invention

Referring to FIG. 1, a drainage system for connecting a rack drain 6 on a laterally slidable mobile plant rack 10 to a stationary building drain 8 according to a first embodiment of the invention is shown generally at 30. The drainage system 30 includes a flexible conduit 40 supported on a plurality of horizontal supports 60 secured to the plant rack 10. The horizontal supports 60 are configured to provide a grade to promote drainage, as will be set out below. The flexible conduit 40 is connected to both the rack drain 6 and the building drain 8, providing fluidic communication therethrough. As the plant rack 10 is shifted laterally, the flexible conduit 40 slides over the horizontal supports 60, maintaining a grade while maintaining the connection between the rack drain 6 and the building drain 8, as will be described further below. It may be noted that only a portion of the plant rack 10 is illustrated herein for clarity. It may also be noted that FIG. 1 illustrates a plant rack 10 with a single drainage system 30, whereas further illustrations include a pair of drainage systems 30. It will be appreciated that the plant rack 10 may be configured to receive at least one drainage system 30.

Figure 2:
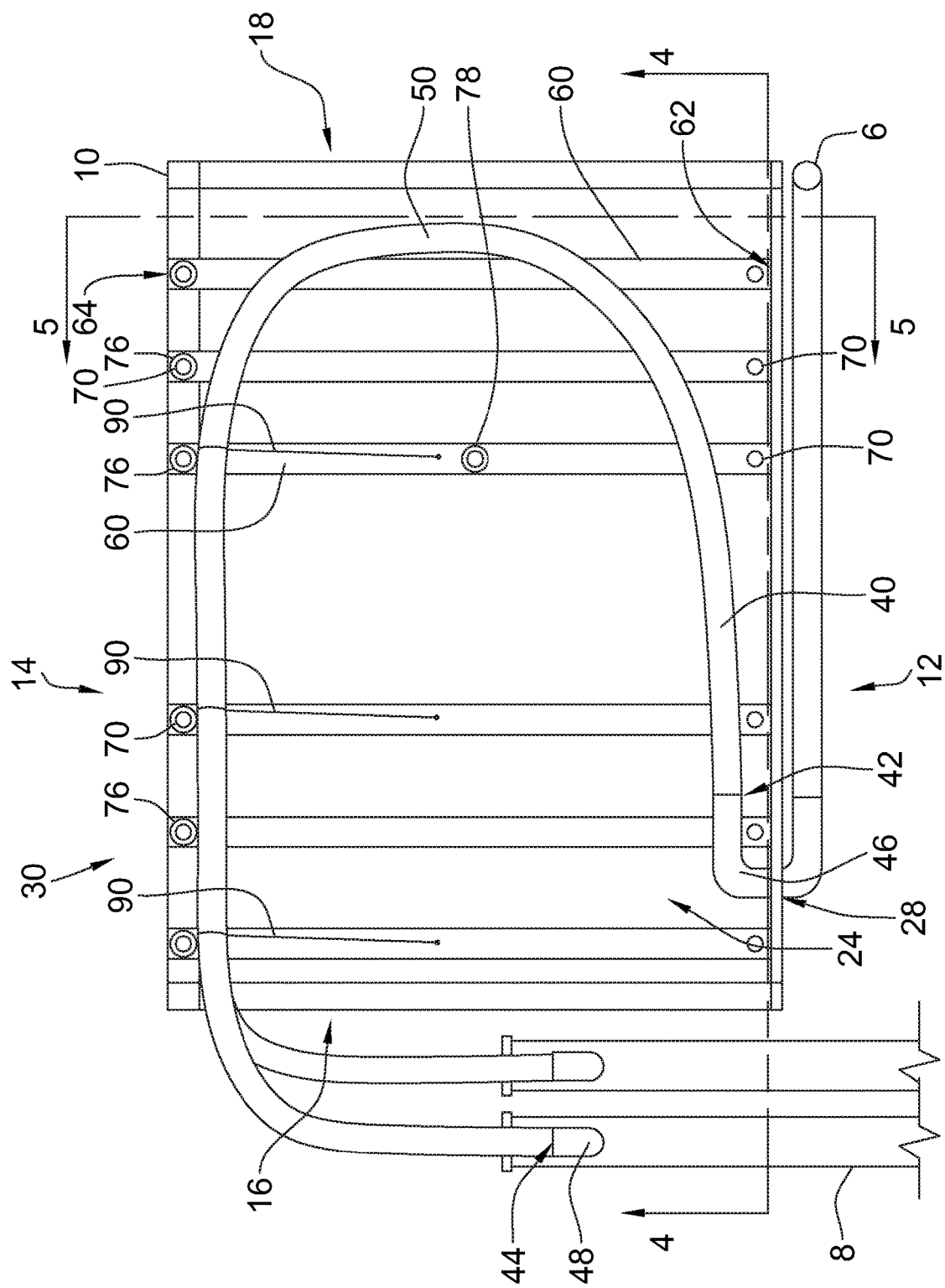
FIG. 2 is a plan view of the plant rack base and drainage system of FIG. 1 in a first position.
Figure 4:
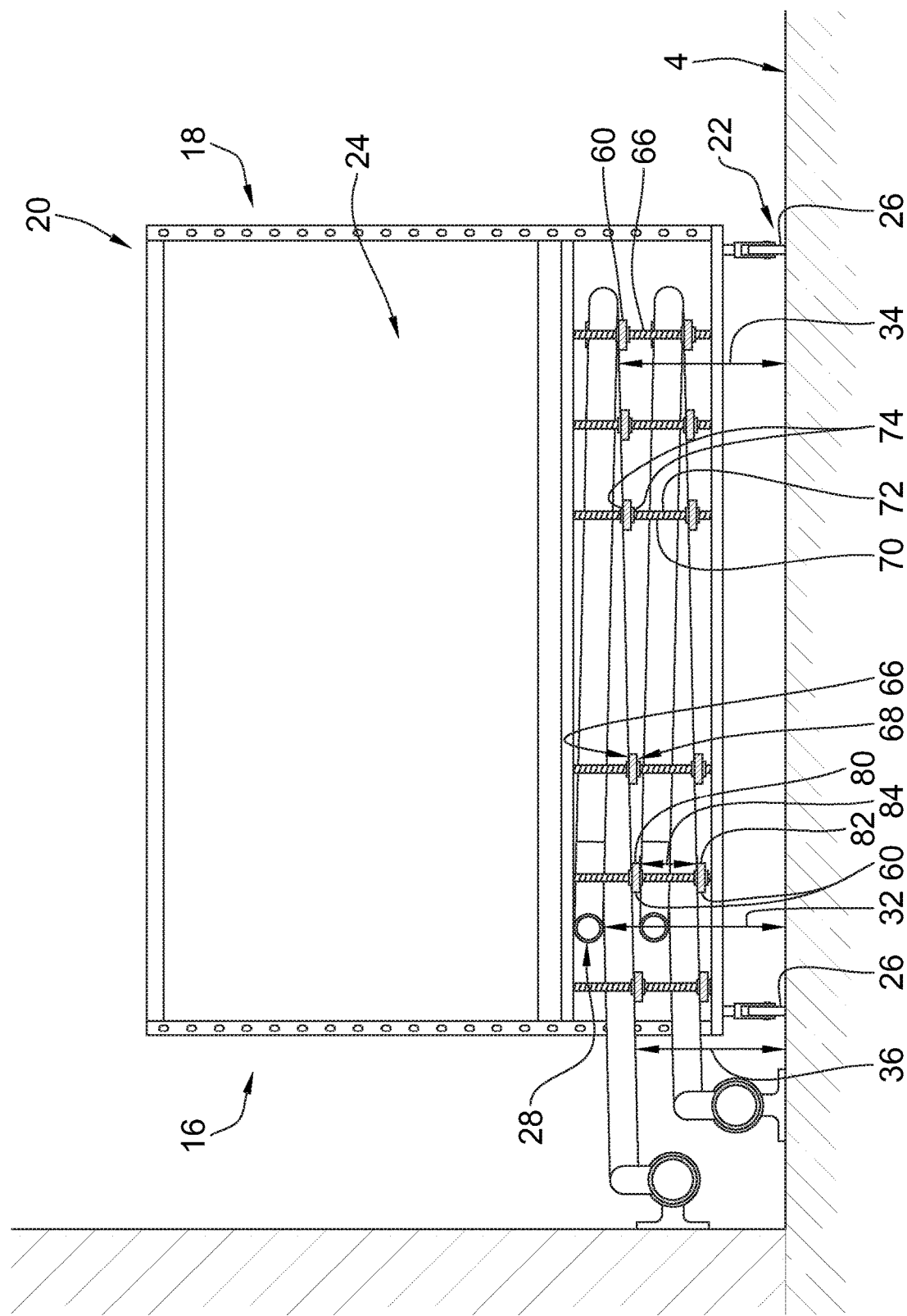
FIG. 4 is a cross-sectional view of the plant rack base and drainage system as taken along line 4-4 of FIG. 2.

Turning now to FIGS. 2 and 4, the plant rack 10 extends between front and rear, 12 and 14, first and second sides, 16 and 18, and between top and bottom, 20 and 22, respectively, and defines an interior space 24. A set of wheels 26 is secured at the bottom 22 to permit lateral movement of the plant rack 10, as is commonly known. The plant rack 10 may be any commonly known frame structure operable to secure horizontal supports, such as shelves, thereto, so as to provide at least one surface to receive a plurality of objects thereon, such as, by way of non-limiting example, plants. As set out above, the plant rack 10 includes a rack drain 6. The plant rack 10 may include a plurality of rack drains 6, each of which is fluidically connected to the drainage system 30. In one example, a plurality of rack drains 6 may all connect into one drainage system 30, whereas another example would have each of a plurality of rack drains 6 connected to a single drainage system 30. Further descriptions herein will include one rack drain 6 per drainage system 30.

The rack drain 6 extends from a location which may be proximate to the top 20 of the plant rack 10 or to any location therein as required by the growing configuration of the plants grown therein to a discharge end 28 proximate to the bottom 22, spaced apart from the first side 16 and extending through the front 12 to the interior space 24. Drainage fluid is directed into the rack drain 6 by means as are commonly known. The rack drain 6 may be a rigid pipe material, such as, by way of non-limiting example, Poly Vinyl Chloride (PVC). The discharge end 28 is positioned at a discharge height 32 above the ground 4, as illustrated in FIG. 4. The discharge height 32 is selected to provide the drainage system 30 with sufficient space for a drainage grade. It will be appreciated that a minimum drainage grade may be such as, by way of non-limiting example, 2%, as is commonly known.

The flexible conduit 40 extends between a receiving end 42 and a discharge end 44 with an arcuate portion 50 therebetween and includes first and second end connectors 46 and 48, respectively, secured to the receiving and discharge ends, 42 and 44, respectively. The first end connector 46 is located within the interior space 24 and may be such as, by way of non-limiting example, an elbow connector, as is commonly known. The first end connector 46 fluidically connects the discharge end 28 of the rack drain 6 with the receiving end 42 of the flexible conduit 40. The first end connector 46 is positioned such that the flexible conduit 40 attached thereto is directed so as to position the arcuate portion 50 proximate to the second side 18. The second end connector 48 is located distal from the plant rack 10, spaced apart from the first side 16 and fluidically connects the discharge end 44 of the flexible conduit 40 to the building drain 8. As illustrated in FIG. 2, the flexible conduit 40 extends arcuately from the receiving end 42 proximate to the front 12 and spaced apart from the first side 16, with the arcuate portion 50 positioned proximate to the second side 18, then continues to extend proximate to the rear 14, past the first side 16 and out of the interior space 24 to the discharge end 44.

The horizontal supports 60 each extend between first and second ends, 62 and 64, respectfully, with the first ends 62 proximate to the front 12 and the second ends 64 proximate to the rear 14. Each horizontal support has top and bottom surfaces, 66 and 68, respectively, as illustrated in FIG. 4. As illustrated in FIG. 2, a plurality of spaced apart elongate horizontal supports 60 may be used, such as, by way of non-limiting example, six horizontal supports 60, although it will be appreciated that more or less horizontal supports 60 may be useful, as well. It may also be appreciated that a single planar support may be used in place of a plurality of elongate supports.

Figure 5:
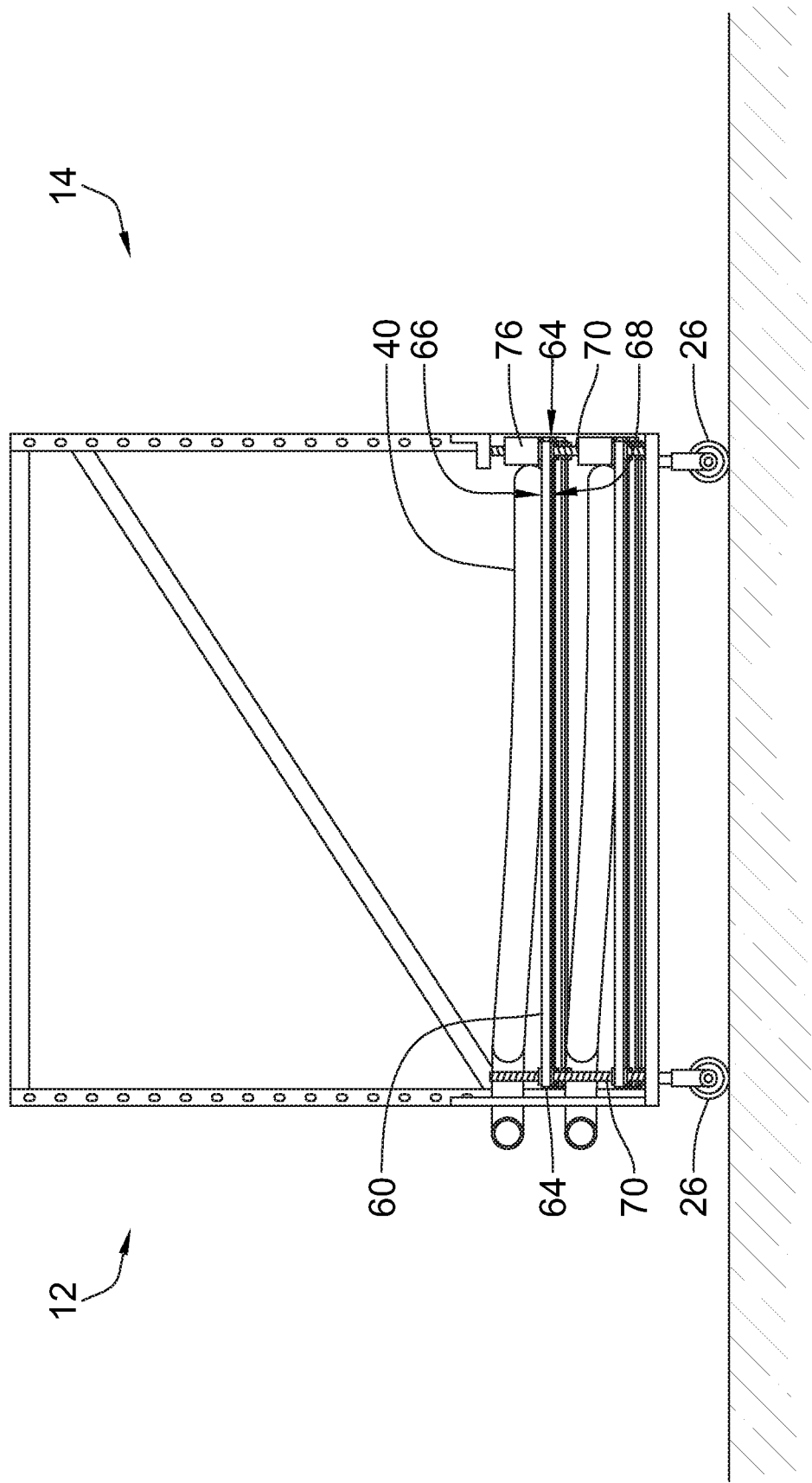
FIG. 5 is a cross-sectional view of the plant rack base and drainage system as taken along the line 5-5 of FIG. 2.

Each horizontal support 60 includes an adjustable height support 70 proximate to the first and second ends 62 and 64 and secured to the plant rack 10 proximate to the bottom 22. As best illustrated in FIG. 4, the adjustable height support 70 includes a threaded rod 72 passing through a hole in the horizontal support 60, with a pair of fasteners 74, such as, by way of non-limiting example, nuts, secured to the threaded rod 72 to engage with the top and bottom surfaces, 66 and 68, of the horizontal support 60, thus retaining the position of the horizontal support 60. Washers, as are commonly known, may be positioned between the fasteners 74 and the horizontal support 60. With this configuration, by adjusting the location of the fasteners 74 on the threaded rods 72, the distance from the ground 4 to the top surface 66 of each horizontal support 60 may be adjustably selected, as is commonly known. As best shown in FIG. 5, the adjustable height supports 70 may be configured such that each horizontal support 60 is substantially horizontal between the first and second ends 62 and 64, although it will be appreciated that the horizontal supports 60 may be adjusted such that the first end 62 is positioned higher than the second end 64 to allow engagement of the flexible conduit 40 on the horizontal support 60 between the receiving end 42 and the arcuate portion 50. As illustrated, the flexible conduit 40 is supported by the first end connector 46 at the receiving end 42, then, at the arcuate portion 50, by the horizontal support 60 proximate to the second side 18 and the remaining length within the interior space 24 between the arcuate portion 50 towards the discharge end 44 supported by the horizontal supports 60 sequentially between the second and first sides 18 and 16, respectively. As illustrated in FIG. 4, the second end support height 34 of the horizontal support 60 proximate to the second side 18 is selected to be at a height to provide a desired grade between the discharge height 32 and the second end support height 34, as set out above. The horizontal support 60 proximate to the first side 16 is positioned at a first end support height 36, selected to provide a grade between the second end support height 34 and the first end support height 36, with the adjustable height supports 70 for the horizontal supports 60 therebetween selected correspondingly.

Figure 3:
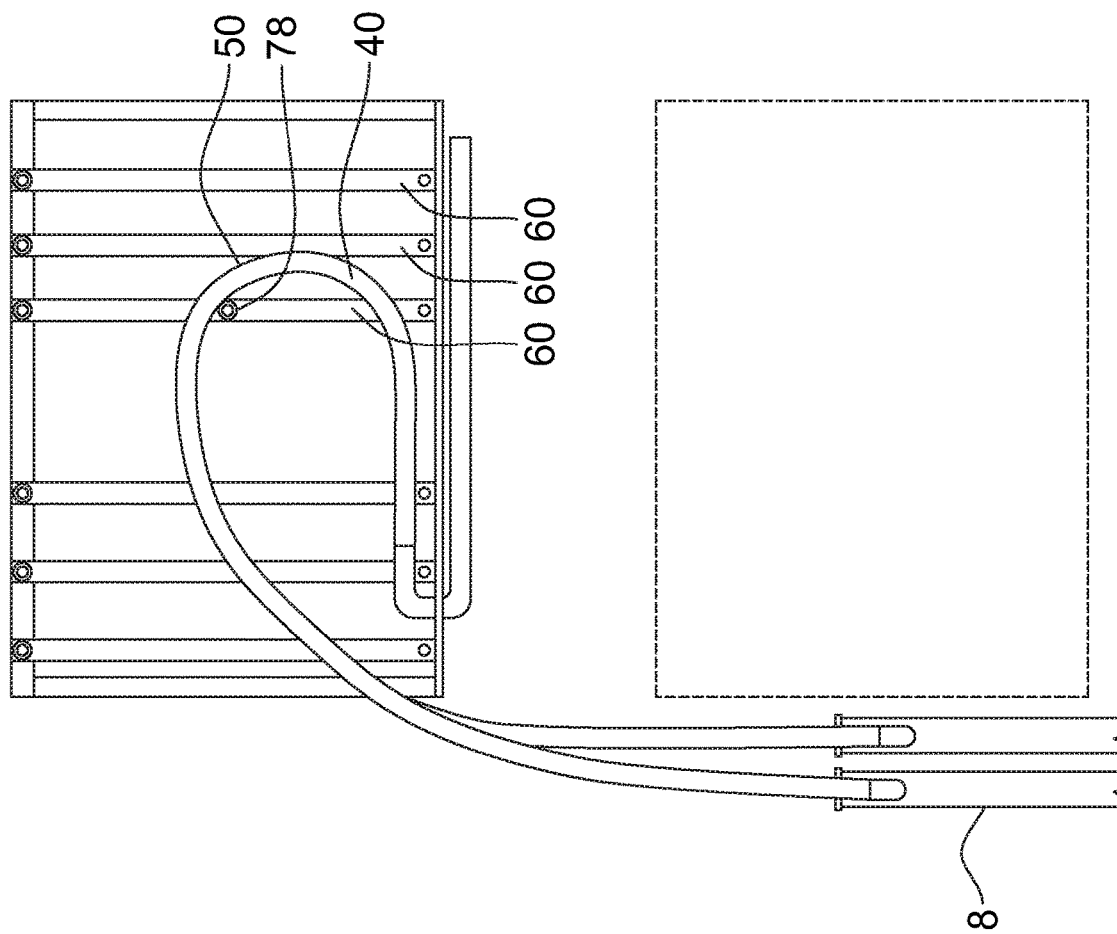
FIG. 3 is a plan view of the plant rack base and drainage system of FIG. 1 in a second position.

Each adjustable height support 70 proximate to the second end 64 of each horizontal support 60 includes a low friction vertical surface thereon, such as a vertical roller 76, as illustrated in FIGS. 2 and 5. The rollers 76 are positioned such that a portion of the flexible conduit 40 may engage thereon, dependent on the position of the plant rack 10. As illustrated in FIG. 2, with the plant rack 10 in a first position, the flexible conduit 40 engages upon a plurality of the rollers 76. As the position of the plant rack 10 is adjusted between the first position illustrated in FIG. 2 and the second position illustrated in FIG. 3, the flexible conduit 40 slides over the horizontal supports 60 and against the rollers 76, which prevent binding and facilitate movement of the flexible conduit 40 therepast. As illustrated in FIG. 2, a central low friction vertical surface, such as a central vertical roller 78, extends upward from the middle of one horizontal support 60. The position of the central vertical roller 78 is selected such that the flexible conduit 40 engages thereon at the arcuate portion 50 when the plant rack 10 is in a second position, as illustrated in FIG. 3. The central vertical roller 78 prevents the flexible conduit 40 from bending back on itself and created a crease therein, as is commonly known, maintaining the arcuate portion 50 therein. It will also be appreciated that other means of preventing the flexible conduit 40 from engaging upon the frame members of the rack may also be utilized such as, by way of non-limiting example, ropes or elastic cords 90 adapted to limit movement of the flexible conduit as illustrated in FIG. 2.

As set out above, a plurality of drainage systems 30 may be used simultaneously on one plant rack 10. As best illustrated in FIGS. 4 and 5, a plurality of levels of horizontal supports 60 may be used to provide support for a plurality of drainage systems 30. As illustrated, two drainage systems 30 are supported by two levels of horizontal supports 60. It will be appreciated that two horizontal supports 60, such as an upper horizontal support 80 and a lower horizontal support 82, are supported on each pair of adjustable height supports 70. The upper and lower horizontal supports 80 and 82 are spaced apart by a distance 84 selected such that the flexible conduit 40 supported on the lower horizontal supports 82 may pass below the upper horizontal supports 80, and slide over the lower horizontal supports 82, as set out above. As illustrated in FIG. 5, an additional set of vertical rollers 76 is included on the adjustable height supports 70 proximate to the rear 14, to prevent binding and facilitate movement of the lower flexible conduit 40 therepast, as set out above. While specific embodiments of the invention have been described and illustrated, such embodiments should be considered illustrative of the invention only and not as limiting the invention as construed in accordance with the accompanying claims.

What is claimed is:

1. A drainage system for connecting a rack drain on a laterally slidable mobile plant rack to a stationary building drain, wherein the mobile plant rack extends between top, bottom, front, rear, first side and second sides defining an interior rack space and the rack drain includes a discharge end, and wherein the mobile plant rack is operable to slide between a first position wherein the stationary building drain is proximate thereto and a second position wherein the stationary building drain is distal thereto, the drainage system comprising:
   at least one horizontal support proximate to the bottom of the mobile plant rack;
   a flexible conduit fluidically connected to the discharge end of the rack drain, extending arcuately between a receiving end fixed within the interior rack space and a discharge end fixed outside of the interior rack space, wherein said discharge end is fluidically connected to the stationary building drain;
   wherein said receiving end of said flexible conduit is raised above said discharge end; and
   wherein said flexible conduit is supported by said at least one horizontal support to maintain a generally down slope grade between said receiving end and said discharge end of said flexible conduit.

2. The drainage system of claim 1 wherein said at least one horizontal support includes a top surface.

3. The drainage system of claim 2 wherein said flexible conduit is supported on said top surface.

4. The drainage system of claim 1 further comprising a substantially horizonal rigid conduit fluidically connected to the discharge end of the rack drain at a first end and extending along the front of the mobile plant rack to a fixed second end positioned within the interior rack space.

5. The drainage system of claim 4 wherein said receiving end of said flexible conduit is fluidically connected to said fixed second end of said rigid conduit.

6. The drainage system of claim 1 further comprising at least one low friction vertical surface proximate to the rear of the plant rack positioned such that a portion of said flexible conduit is engageable thereon.

7. The drainage system of claim 6 wherein said at least one low friction vertical surface comprises a plurality of vertical rollers distributed between the first and second sides.

8. The drainage system of claim 6 wherein said flexible conduit engages upon said at least one low friction vertical surface at the first position.

9. The drainage system of claim 1 further comprising a substantially horizontal second flexible conduit, vertically spaced apart from said flexible conduit, said second flexible conduit fluidically connected to the discharge end of the rack drain, extending arcuately between a second flexible conduit receiving end fixed within the interior rack space and a second flexible conduit discharge end fixed outside of the interior rack space, wherein said second flexible conduit discharge end is fluidically connected to the stationary building drain.

10. The drainage system of claim 1 wherein said flexible conduit is formed with a material selected from a group consisting of polyvinyl chloride tubing and polyethylene tubing.

* * * * *